United States Patent
Hammond

[11] Patent Number: 6,050,384
[45] Date of Patent: Apr. 18, 2000

[54] METHOD AND APPARATUS FOR RAPID TRANSMISSION BRAKE RELEASE

[76] Inventor: Edmund Hammond, 2204 Snyder Hill Rd., Cortland, N.Y. 13045

[21] Appl. No.: 09/215,911

[22] Filed: Dec. 18, 1998

[51] Int. Cl.[7] .............................. B60K 41/26; B21K 23/00
[52] U.S. Cl. ........................................... 192/221; 29/401.1
[58] Field of Search ..................... 192/218, 221, 192/222, 3.34, 106 R, 106 F; 74/606 R, 732.1; 29/401.1

[56] References Cited

U.S. PATENT DOCUMENTS

| | | | |
|---|---|---|---|
| 4,574,931 | 3/1986 | Kowalczyk | 192/106 F |
| 4,842,010 | 6/1989 | Edgecomb et al. | 74/606 R X |
| 4,883,151 | 11/1989 | Tobler | 192/221 |
| 5,090,528 | 2/1992 | Massel | 192/3.34 |
| 5,148,720 | 9/1992 | Swenson et al. | 74/606 R |
| 5,426,991 | 6/1995 | Ohkawa et al. | 74/606 R X |
| 5,611,372 | 3/1997 | Bauer et al. | 74/606 R X |
| 5,622,088 | 4/1997 | Reid | 74/606 R |
| 5,662,198 | 9/1997 | Kojima et al. | 192/106 F X |
| 5,694,817 | 12/1997 | Reid | 74/606 R |

OTHER PUBLICATIONS

Lucas Electronics Ledex Solenoid Catalog, 2 pages.

*Primary Examiner*—Rodney H. Bonck
*Attorney, Agent, or Firm*—Brown, Pinnisi & Michaels, P.C.

[57] ABSTRACT

A modification to an automatic transmission having a transmission brake, especially applicable to the TurboHydramatic 400 transmission, allowing for fast, consistent release of the transbrake. The reverse servo cover is modified to add a pressure release passageway communicating with the inside of the reverse servo cover and dumping fluid into the transmission pan. The passageway is selectively blocked by an electrically operated solenoid having a shaft or needle fitting into a seat, so that when the solenoid is powered, the solenoid shaft or needle fits tightly into the seat, preventing the flow of hydraulic fluid from the inside of the reverse servo cover. When power is removed, the pressure of the fluid instantly pushes the solenoid shaft back from the seat, dumping pressure from the reverse servo nearly instantaneously.

13 Claims, 2 Drawing Sheets

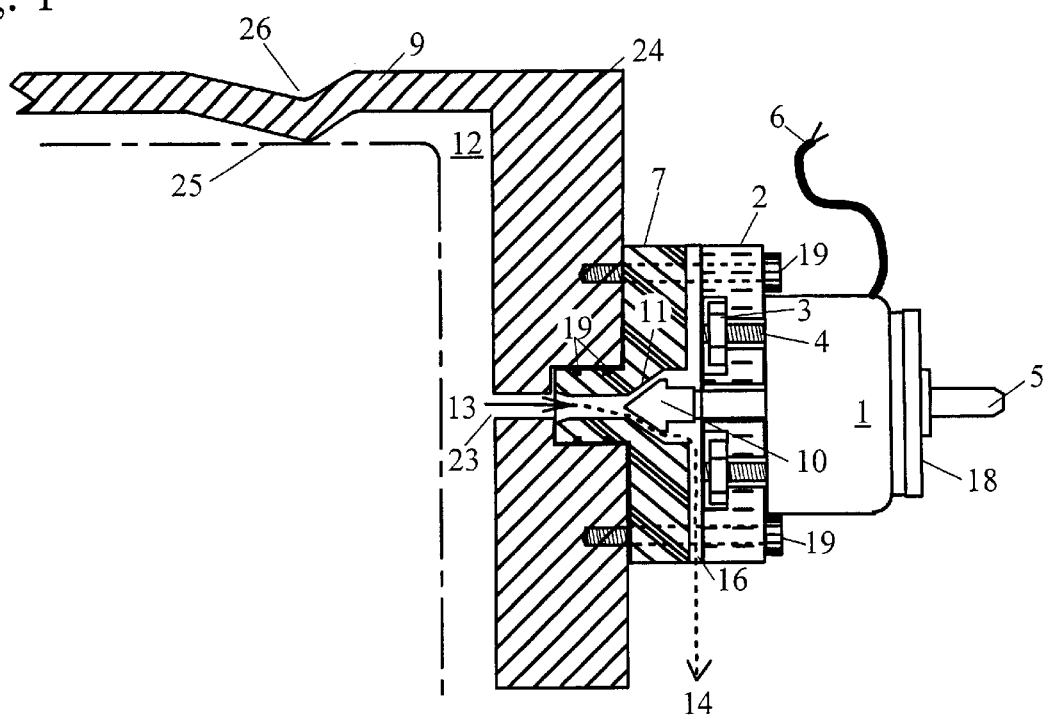
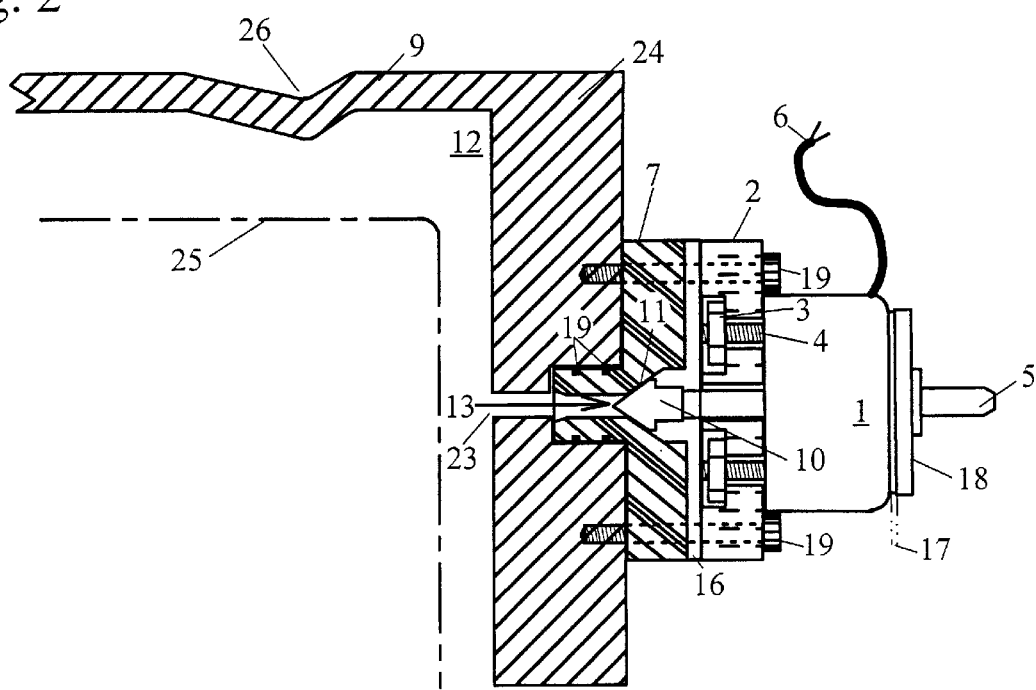

METHOD AND APPARATUS FOR RAPID TRANSMISSION BRAKE RELEASE

FIELD OF THE INVENTION

The invention pertains to the field of automobile transmissions. More particularly, the invention pertains to methods and apparatus for enhancing the release of automatic transmission "transbrakes" in drag racing applications.

BACKGROUND OF THE INVENTION

A drag race is an acceleration contest from a standing start between two vehicles over a measured distance. The accepted standard for that distance is either a quarter-mile (1,320 feet) or an eighth-mile (660 feet). These contests are started by means of an electronic device commonly called a "Christmas Tree" because of its multicolored starting lights. On each side of the Tree are seven lights: two small amber lights at the top of the fixture, followed in descending order by three larger amber bulbs, a green bulb, and a red bulb.

When the racer rolls forward into the staging beams, the front tires are positioned exactly on the starting line and the stage bulbs are lit on the Tree, which indicates that the vehicle is ready to race. When both vehicles are fully staged, the starter will activate the Tree, and each driver will focus on the three large amber lights on his or her side of the Tree.

Depending on the type of racing, all three large amber lights will flash simultaneously, followed four- or five-tenths of a second later by the green light (called a Pro Tree), or the three bulbs will flash consecutively five-tenths of a second apart, followed five-tenths later by the green light (called a Sportsman, or full, Tree). The car may not leave the start line before the green light is illuminated, and the first car across the finish line (without breaking out, if applicable) is the winner.

The reaction time of the driver and the car are critical factors in winning the race. Differences in reaction time of only a few thousandths of a second can mean the difference between winning and losing, and consistency of reaction is critical.

Most drag race cars use extensively modified automotive automatic transmissions. One of the more common modifications is to include a transmission braking system or "transbrake". The transbrake typically replaces the factory modulator valve with a special solenoid-operated valve controlled by electronic circuitry. By simultaneously applying low and reverse, a transbrake locks the automatic transmission, holding the vehicle's position. When the transbrake activating button is released the reverse hydraulic circuit is dumped allowing the vehicle to launch.

One of the most common transmissions to be so modified is the General Motors TurboHydramatic model 400 (TH400), which uses a band/drum arrangement for reverse. The reverse servo of the TH400 is easily accessible through a reverse servo cover. Other commonly used transmissions which can be modified with transbrakes are the Powerglide and TH350, both of which use a piston/clutch arrangement.

A drawback of commonly used transbrake controls is that, in order to release the transbrake, the hydraulic pressure on the reverse applicator (piston or servo) must be dumped as closely to instantaneously as possible. Any delay in pressure reduction translates directly into delay in reaction time and inconsistency in starting. Unfortunately, because of the design of automatic transmissions, with their maze of serpentine passages for fluid, there is significant hydraulic resistance as the fluid flows out of the reverse applicator, making the release of the applicator erratic and slower than desired. While attempts have been made to make the release of the applicator faster, they often require modification or replacement of the transmission case, a very expensive and complicated proposition.

Tobler's "Transmission Brake", U.S. Pat. No. 4,883,151, is for a transmission brake in which the conventional shifter is replaced by a control valve having a "brake" position. The remote valve and shifter mechanism would still entail the problems of slow fluid release noted above, with the additional factor of having to shift the transmission out of "brake" and into "low". Most drag racing applications currently use an electronic switch to initiate the release of the transbrake to avoid this delay.

Reid, in "Automatic Transmission for Racing Vehicle", U.S. Pat. No. 5,622,088, and related patent "Air Bleed and Adjustable Reverse Piston Release Rate in an Automatic Transmission for a Racing Vehicle", attempts to address the pressure dumping problem by providing special passages and adjustable valves for releasing the reverse piston, especially in the embodiment shown in FIG. 6. Nonetheless, the fluid still must release through the same passage as it was applied, at least partially, and Reid's invention involves extensive modifications to the transmission case.

SUMMARY OF THE INVENTION

The invention comprises a modification to an automatic transmission having a transmission brake, especially applicable to the TurboHydramatic 400 transmission, allowing for fast, consistent release of the transbrake. The reverse servo cover is modified to add a pressure release passageway communicating with the inside of the reverse servo cover and dumping fluid into the transmission pan. The passageway is selectively blocked by an electrically operated solenoid pushing a needle into a valve seat in a seat plate. When the solenoid is powered, the needle fits tightly into the seat, preventing the flow of hydraulic fluid from the reverse servo. When power is removed, the pressure of the fluid instantly pushes the needle back from the seat, dumping pressure from the reverse servo nearly instantaneously.

BRIEF DESCRIPTION OF THE DRAWING

FIG. 1 shows a close up, partially cut-away view of the solenoid assembly of the invention, mounted upon the modified reverse servo cover, with the solenoid in its unpowered state.

FIG. 2 shows a close up, as in FIG. 1, with the solenoid in its powered state.

DESCRIPTION OF THE PREFERRED EMBODIMENT

Figure 3:
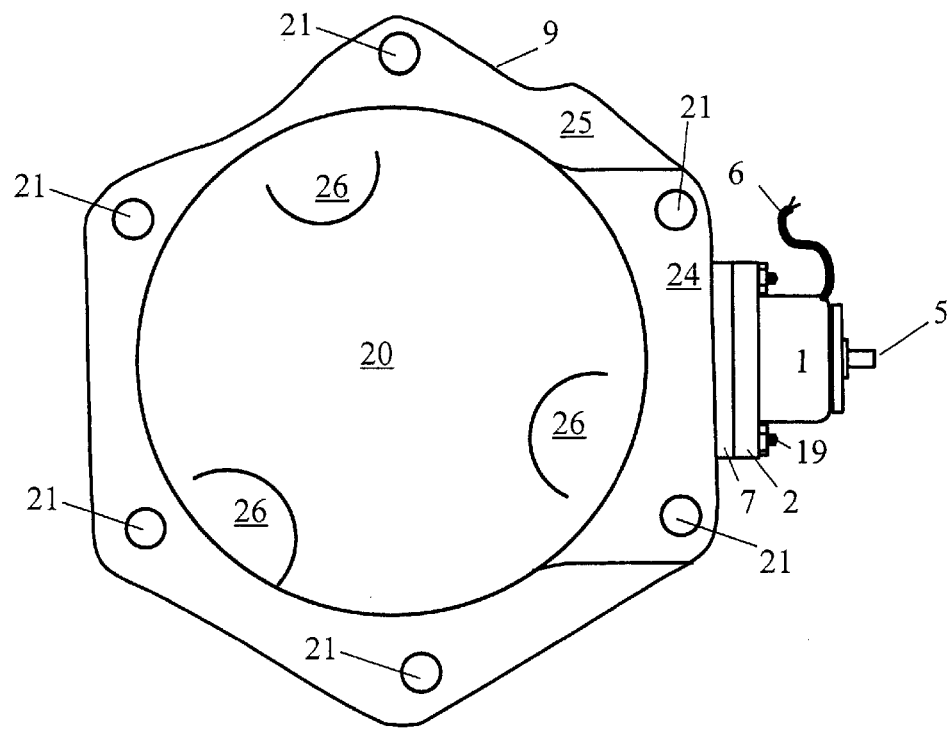
FIG. 3 shows a bottom view of the modified reverse servo cover of the invention, with the electrical solenoid mounted.

FIG. 3 shows a replacement reverse servo cover (9) from a TurboHydramatic 400 transmission, modified according to the teachings of the invention. The details of the invention described below are in the context of a TH400, being the most common transmission in drag racing with a design lending itself to this modification. However, it will be understood by one skilled in the art that there may be other transmission models, now existing or developed in the future, which may be similarly modified.

It will be understood that the reverse servo cover (9) is mounted inside the transmission pan, enclosing the reverse servo, with the "up" direction when mounted being into the paper in this view. The reverse servo cover (9), made of steel in the original but preferably machined from aluminum in the modified form of the invention, has a domed center (20) into which the reverse servo fits. Indentations (26) in the domed center (20) act as stops on the inside surface of the dome, against which the reverse servo will rest, as described below. It has a flange (25) surrounding the domed center (20), having mounting holes (21), through which bolts will fit, securing the cover to the bottom of the transmission case.

The modification of the invention adds a thickened flange section (24) to the side of the domed center section (20). As will be discussed in greater detail below, the thickened flange section has a fluid passageway drilled into the inside of the reverse servo cover, a recess for the valve seat plate (7), and mounting holes for the bolts (19) securing the solenoid mounting plate (2) and valve seat plate (7). The solenoid actuating wire (6) is routed to control circuitry, which is also discussed below.

Because the reverse servo cover (9) is modified from the stock servo cover which would be supplied with the transmission, the invention may be implemented easily by replacement of the stock reverse servo cover with the modified cover, without the need for modification to the transmission itself.

FIGS. 1 and 2 show the details of the modification of the invention. In FIG. 1, the solenoid is unpowered (i.e. transbrake "off" and not third or reverse gear), and in FIG. 2 the solenoid is powered (i.e. transbrake "on" or third or reverse gear).

As can be seen in these figures, the thickened flange section (24) of the reverse servo cover (9) has a passageway (23) communicating into the inside (12) of the servo cover (9). The passageway (23) has a widened portion into which the valve seat plate (7) will fit, and provides a route for hydraulic pressure (13) inside the reverse servo cover (12) to exhaust (14) into the transmission pan.

A valve seat plate (7), preferably made from Delrin® acetal resin (DuPont), is fit into the passageway (23). O-ring seals (19) may be provided if desired, for a fluid-tight fit. The valve seat plate (7) has a central bore (11) for the passage of fluid, tapering to a seat portion against which the needle (10) attached to the solenoid (1) shaft (5) will tightly seal when the solenoid is actuated, as shown in FIG. 2. The central bore (11) is made as large as possible, preferably as much as ⅜", or more, for maximum fluid flow while dumping the pressure in the reverse servo, consistent with the diameter of the needle (10) and the force needed to hold the needle (10) in the seat. The valve seat plate (7) is provided with side passageways (16) through which the fluid may flow (14) from the central bore (11) when the valve is open.

It will be understood that while the provision of a needle (10) is preferred, the end of the solenoid shaft (5) itself could be used to block the bore (11), with an appropriately shaped seat portion. However, this would limit the diameter of the bore to less than the diameter of the solenoid shaft, which would not be as desirable as the wider bore permitted by the needle (10).

The electrical solenoid (1) is preferably a 12-volt linear unit. The electrical specifications of the solenoid may vary, and should be chosen so that the electrical solenoid has sufficient force to resist the pressure from the reverse servo at the valve seat. As an example, the Lucas/Ledex model 129450-024 solenoid, which has been used successfully with the invention, can exert a force of 70 pounds or more at a 30% duty cycle rating, at 0.015" stroke and at 12 V supply voltage. This is sufficient for the 220–230 psi pressure typical in a TH400 transmission, with a ⅜" orifice in the valve seat.

The electrical solenoid (1) has an actuating member (18), which is attracted by the coil of the solenoid, to which is attached the central shaft (5). Application of electrical power to the solenoid through wires (6) causes the coil to attract the actuating member (18), and moving the shaft (5) and actuating member (18) from an unpowered position shown in FIG. 1 to a powered position shown in FIG. 2, and applying a force holding the shaft in place. The force applied depends in part upon the gap (stroke) (17) between the actuating member (18) and the solenoid body (1), with the force exerted being greater the smaller the gap. The force may be estimated from graphs supplied by the solenoid manufacturer (see, for example, Ledex Solenoids data sheet "Size 5SF—Push or Pull", page G10, Lucas Electric Company).

The electrical solenoid (1) is mounted to a solenoid mounting plate (2) in whatever way is appropriate to the specific solenoid chosen. As shown in FIGS. 1 and 2, the specified Ledex solenoid has rear mounting studs (4), which pass through holes in the solenoid mounting plate (2) and are secured by nuts (3), which are recessed into the face of the mounting plate (2), to allow the solenoid mounting plate to be mounted flush to the valve seat plate (7). Additional holes are provided for the extension of the shaft (5) from the solenoid (1) and for mounting bolts (19). The valve seat plate (7) and solenoid mounting plate (2) are assembled together, with the needle (10) in the seat (11), and fastened to the plate (24) with mounting bolts (19). As will be understood, other solenoid and seat designs are possible within the teachings of the invention, and may necessitate other methods of attachment.

As shown in FIG. 1, when the power is removed from the electrical solenoid, the pressure (13) in the reverse servo cover bore (12) pushes the shaft (5) back out. In the Ledex solenoid of the example, this travel is approximately 0.125" to 0.140", which is ample to allow passage of the fluid from the reverse servo chamber (12) through the seat (11) and out (14) passageways (16) to the pan in a very short period of time.

Figure 4:
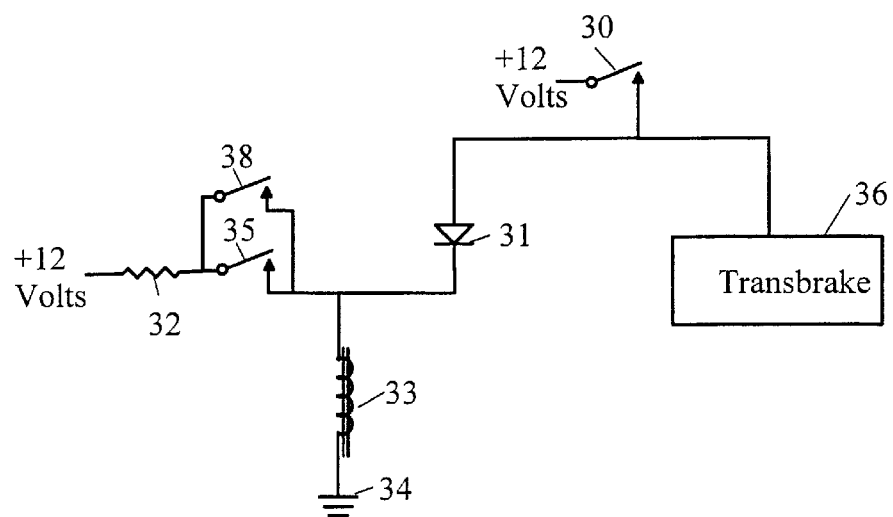
FIG. 4 shows a schematic of the electrical parts of the invention.

FIG. 4 shows a schematic of the electrical connection of the invention. The solenoid coil (33) is connected on one end to ground (34). The other end of the coil (33) is connected through a diode (31) to the switch (30) which also actuates the conventional transmission brake solenoid (36). By using the conventional transbrake circuit in parallel with the solenoid of the invention, a "fail safe" is provided, in which the worst-case scenario if the electrical solenoid of the invention sticks "on" is that the conventional transbrake solenoid operates normally and the race can proceed, albeit without the benefits of the invention. The diode serves the "check valve" function of preventing current flow from the electrical solenoid (33) back to the transbrake solenoid (36), as discussed below, and also reduces the voltage applied to the electrical solenoid (33) through switch (30) by the amount of the forward voltage drop of the diode (normally about 0.7 volts).

In the TH400 transmission with most transbrakes, fluid is usually routed to the bottom of the reverse servo to act as an accumulator when the transmission is in third gear. This requires that the electrical solenoid of the invention be once again actuated, to allow the fluid to accumulate when the transmission is shifted into third. One or more normally open microswitches (35)(38) are provided on the shifter, connected through resistor (32) to the +12 volt supply. The resistor (32) is chosen to give 100% duty cycle capability on the solenoid at about 8 Volts DC, to allow sufficient force and longevity for the solenoid. For the Ledex solenoid of the example, a 2.2 ohm resistor is appropriate. Microswitch (35) is mounted on the shifter and actuated by the gate at the third gear position so that when the shifter is moved into third, the microswitch (35) closes the circuit and activates the electrical solenoid (33), allowing pressure to activate the reverse servo as needed. Similarly, microswitch (38) is mounted on the shifter and actuated by the gate at the reverse gear position so that when the shifter is moved into reverse, the microswitch (38) closes the circuit and activates the electrical solenoid (33), allowing pressure to activate the reverse servo as needed. In some shifter gates, third and reverse might share a location such that one switch might suffice. The diode (31) prevents this application of power to the electrical solenoid (33) from also activating the transbrake solenoid (36). In the TH400 transmission, if the third gear microswitch (35) were to actuate while the transmission were still in second, for example if the switch were misadjusted, application of power to the transbrake solenoid would cause the transmission to shift into third gear instead of second. In a transmission or transbrake which did not require the activation of the reverse servo except during application of the transbrake, microswitches (35) and/or (38) and diode (31) could be omitted.

The operation of the invention may be summarized as follows: The transmission is in "low" (first) as the car pulls up to the line, and the transbrake (36) is engaged by switch (30), applying fluid pressure to the reverse servo. This locks the transmission, holding the car in place as the engine is fed gas preparatory to leaving the line. At the same time, the electrical solenoid coil (33) is actuated via diode (31), forcing the electrical solenoid (1) shaft (5), attached to needle (10) into the seat (11), and allowing pressure to build in the reverse servo cover bore (12).

When the driver wants to start, he or she releases the transbrake switch (30), which deactivates both the conventional transbrake (36) and the electrical solenoid (1), either immediately or after a preselected delay, if a delay box is used. While the release of the conventional transbrake solenoid allows the fluid in the reverse servo to return down the sinuous passageway in the transmission body, the simultaneous release of the electrical solenoid (1) instantaneously dumps the pressure directly into the transmission pan, and the transbrake releases nearly instantly.

In actual tests, the release time of the transmission was reduced from an average of 57 milliseconds, with a great deal of variability, using the conventional transbrake solenoid, to a nearly consistent 19±2 milliseconds with the system of the invention on the test transmission, a TH400 with a Hipster transbrake (a product of Automatic Transmission Design, German Town, Wis.).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. An improved transmission brake release for a transmission having a case and a pan, and a transmission brake which applies a reverse applicator, and an applicator cover on the case inside the pan, communicating with the reverse applicator and having a passageway for fluid passage from the reverse applicator to the pan, comprising:

a. an electrical solenoid mounted upon the applicator cover, having an actuating coil and a shaft which is forced into a first position when power is applied to the actuating coil, and which is movable to a second position when power is not applied to the actuating coil;

b. the electrical solenoid being mounted upon the applicator cover in such a position and orientation such that when the shaft of the electrical solenoid is in the first position, the shaft seals the passageway through the applicator cover, and when the shaft of the electrical solenoid is in the second position, fluid from the reverse applicator may flow through the passageway into the transmission pan.

2. The transmission brake release of claim 1, further comprising a valve seat mounted upon the applicator cover, within the passageway through the applicator cover, having an orifice communicating with the reverse applicator on a first side and communicating with the transmission pan on the opposite side, the orifice being sized on the opposite side from the reverse applicator such that the orifice can be sealed by the shaft of the electrical solenoid.

3. The transmission brake release of claim 2, further comprising a valve needle mounted upon the shaft of the electrical solenoid, and fitting within the valve seat, such that the orifice is sealed by the valve needle.

4. The transmission brake release of claim 1, in which the transmission is a General Motors TurboHydramatic model 400 automatic transmission.

5. The transmission brake release of claim 1, in which the transmission brake is electrically actuated by a transmission brake switch, and the actuating coil of the electrical solenoid is electrically coupled to the transmission brake switch, such that when the transmission brake switch is actuated, power is applied to the electrical solenoid coil.

6. The transmission brake release of claim 1, further comprising a switch connected to the actuating coil of the electrical solenoid, the switch being mounted such that it is actuated when the transmission is in third gear, such that power is applied to the actuating coil of the electrical solenoid when the transmission is in third gear.

7. The transmission brake release of claim 1, further comprising a switch connected to the actuating coil of the electrical solenoid, the switch being mounted such that it is actuated when the transmission is in reverse gear, such that power is applied to the actuating coil of the electrical solenoid when the transmission is in reverse gear.

8. The method of modifying a transmission having a case and a pan, and a transmission brake which applies a reverse applicator, and an applicator cover on the case inside the pan, communicating with the reverse applicator, for rapid release of the transmission brake, the method comprising the steps of:

a) boring a passageway for the passage of fluid through the applicator cover for fluid passage from the reverse applicator to the pan;

b) mounting an electrical solenoid on the applicator cover, the electrical solenoid having an actuating coil and a shaft which is forced into a first position when power is applied to the actuating coil, and which is capable of retracting to a second position when power is not applied to the actuating coil; the electrical solenoid being mounted upon the applicator cover in such a position and orientation such that when the shaft of the electrical solenoid is in the first position, the shaft seals passageway through the applicator cover, and when the shaft of the electrical solenoid is in the second position, fluid from the reverse applicator may flow through the passageway into the transmission pan.

9. The method of claim 8, further comprising the step, between steps (a) and (b), of inserting a valve seat within the passageway through the applicator cover, the seat having an orifice communicating with the reverse applicator on a first side and communicating with the transmission pan on the opposite side, the orifice being sized on the opposite side from the reverse applicator such that the orifice can be sealed by the shaft of the electrical solenoid.

10. The method of claim 9, further comprising the step of providing a valve needle mounted upon the shaft of the electrical solenoid, and fitting within the valve seat, such that the orifice is sealed by the valve needle.

11. The method of claim 8, in which the transmission brake is electrically actuated by a transmission brake switch, further comprising the step of coupling the actuating coil of the electrical solenoid to the transmission brake switch, such that when the transmission brake switch is actuated, power is applied to the electrical solenoid coil.

12. The method of claim 8, in which the transmission has a shifter for selecting a gear, further comprising the steps of mounting a switch in proximity to the shifter such that it is actuated when the transmission is in third gear and coupling the switch to a source of electrical power and to the actuating coil of the electrical solenoid, such that power is applied to the actuating coil of the electrical solenoid when the transmission is in third gear.

13. The method of claim 8, in which the transmission has a shifter for selecting a gear, further comprising the steps of mounting a switch in proximity to the shifter such that it is actuated when the transmission is in reverse gear, and coupling the switch to a source of electrical power and to the actuating coil of the electrical solenoid, such that power is applied to the actuating coil of the electrical solenoid when the transmission is in reverse gear.

* * * * *